United States Patent [19]
Balatan

[11] Patent Number: 5,017,673
[45] Date of Patent: May 21, 1991

[54] NONIONICALLY STABILIZED POLYESTER URETHANE RESIN FOR WATER-BORNE COATING COMPOSITIONS

[75] Inventor: Sergio E. Balatan, West Bloomfield, Mich.

[73] Assignee: BASF Corporation, Southfield, Mich.

[21] Appl. No.: 420,794

[22] Filed: Oct. 12, 1989

[51] Int. Cl.[5] .............................................. C08G 18/42
[52] U.S. Cl. ........................................ 528/59; 528/60; 528/65; 528/67; 528/74.5; 528/76; 528/77; 428/423.1
[58] Field of Search ...................... 528/59, 60, 65, 67, 528/74.5, 76, 77; 428/423.1

[56] References Cited

U.S. PATENT DOCUMENTS

| | | | |
|---|---|---|---|
| 3,796,678 | 3/1974 | Bartizal | 260/29.2 |
| 3,894,131 | 7/1975 | Speech | 260/29.2 |
| 3,905,929 | 9/1975 | Noll | 260/29.2 |
| 3,920,598 | 11/1975 | Reiff et al. | 260/29.2 |
| 3,935,146 | 1/1976 | Noll et al. | 260/29.2 |
| 4,190,566 | 2/1980 | Noll et al. | 260/29.2 |
| 4,528,319 | 7/1985 | Ottavuani et al. | 524/500 |
| 4,533,704 | 8/1985 | Alexander et al. | 428/423.1 |
| 4,588,787 | 5/1986 | Kordomenos et al. | 525/440 |
| 4,794,147 | 12/1988 | Savino et al. | 525/440 |

*Primary Examiner*—Maurice J. Welsh
*Attorney, Agent, or Firm*—Jerry F. Janssen; Cary W. Brooks

[57] ABSTRACT

Laterally stabilized, water-miscible polyester polyurethane resins, useful as principal binder resins and as pigment grind resins in water-borne coating systems are the reaction product of one or more polyols, one or more polyisocyanates, and a polyester prepolymer formed by the reaction of a polyether alcohol, one or more polyols, and one or more polyfunctional carboxylic acids. The resins have a polyester polyurethane backbone with pendant polyether groups, attached to the polyester segments of the backbone, which serves to solubilize and stabilize the resins in aqueous media. The resins have small dispersion particle size at the same or higher molecular weights than similar prior art resins, and produce better metal flake orientation when used as the principal resins in base coat formulations which contain aluminum and mica particulates for "metallic" effect coating finishes.

18 Claims, No Drawings

5,017,673

NONIONICALLY STABILIZED POLYESTER URETHANE RESIN FOR WATER-BORNE COATING COMPOSITIONS

TECHNICAL FIELD

The present invention relates to polymer compositions, to coating compositions comprising such polymers, and to substrates coated with such coating compositions. More particularly, the present invention concerns water-dispersible polyester urethane polymers stabilized by pendant polyether groups, to coating compositions comprising these polymers and to substrate bodies coated with these coating compositions.

BACKGROUND OF THE INVENTION

In the coatings art, there has been an increasing emphasis upon lowering the volatile organic content of paints and similar coatings compositions. This concern stems both from the increasing costs of organic solvents as well as problems associated with the environmental impact of the use of such volatile organic solvents and the costs involved in ameliorating such environmental impact. To address these concerns, research efforts in the coatings art have recently been focused upon water-borne coating compositions. To achieve dispersibility in an essentially aqueous medium, polymer resins employed as the principal binder resin and as pigment grind resins for water-borne coating systems must be stabilized. The mode of stabilization may be ionic or nonionic. Typical ionically stabilized water-borne paint formulations employ polymers which contain a fraction of ionizable functional groups such as carboxyl group-containing monomers. Neutralization of the acid functionality provides the degree of water miscibility required to stabilize the resin in aqueous systems.

Typical nonionically stabilized water-borne resins employ monomers which contain a certain fraction of nonionic hydrophilic groups for stabilization. Water-dispersible nonionically stabilized polyurethane resins useful in the preparation of coating compositions are well known in the art. These compositions typically contain hydrophilic centers which impart water miscibility to otherwise hydrophobic polymers. The most effective hydrophilic groups are polyether or poly(oxyalkylene) groups.

Water-dispersible nonionic polyurethane resins known in the prior art are best exemplified by those disclosed and claimed in U.S. Pat. Nos. 4,190,566 to Noll and 4,794,147 to Savino, et al. In both patents, the polyurethane resins are the reaction products of a polyester prepolymer, diols, triols, a polyether alcohol, and a polyisocyanate. In these resins the polyether segments, which serve to stabilize the resin in aqueous medium, are located within the polyurethane segments of the polymer. The polar, water miscible polyether segments are thus located at some distance in the polymer backbone from the more hydrophobic polyester segments. This arrangement does not make the best use of the stabilizing effect of the polar, hydrophilic polyether segments with the result that a higher fraction of polyether segments is required in the final polyester polyurethane resin to achieve stabilization in aqueous medium.

SUMMARY OF THE INVENTION

In accordance with the principal embodiment of the present invention, there are provided laterally stabilized water-dispersible polyester polyurethane resins which are useful as principal binder resins and as pigment grind resins for the formulation of water-borne decorative and protective coatings, particularly as base coat formulations for automotive applications. The resins comprise a water-dispersible, laterally stabilized polyester polyurethane resins which are the reaction products of a) at least one organic compound having two or more reactive hydrogen functional groups; b) a polyisocyanate; and c) a polyester prepolymer which is the reaction product of i) an organic compound having at least three reactive carboxyl acid groups; and ii) a polyether alcohol.

In accordance with another embodiment of the invention, there is provided a method of preparing the laterally stabilized water-dispersible polyester polyurethane resins described above.

In accordance with yet another embodiment of the present invention there are provided water-borne coating formulations comprising a laterally stabilized water-dispersible polyester polyurethane resin of this invention.

In accordance with a further embodiment of the present invention there are provided substrate bodies coated with one or more coating formulation in accordance with the present invention.

The resins of this invention are the reaction product of a polyester component, comprising between about 10% by weight to about 30% by weight of polyether stabilizing groups, with a polyisocyanate and one or more polyols. The resulting resins comprise a copolymer of polyester and polyurethane segments with pendant polyether stabilizing groups randomly distributed along the chain of the polyester segments. The polyether groups provide the hydrophilicity necessary to stabilize the resin in aqueous media and permit smaller resin particle size in aqueous dispersions while maintaining high molecular weight.

DETAILED DESCRIPTION AND BEST MODE FOR CARRYING OUT THE INVENTION

The laterally stabilized water-miscible polyester polyurethane resins of this invention comprise from about 50% by weight to about 85% by weight polyester segments, with the balance comprising polyurethane segments. The polyester segments comprise between about 10% by weight to about 30% by weight pendant polyether stabilizing groups randomly distributed along the polyester chain. This arrangement permits the production of polyester polyurethane resins having high molecular weights yet small particle dispersion size in aqueous systems, while utilizing lesser amounts of polyether stabilizing segments in the polymers than in prior art resins. A comparison of the properties for several polyester polyurethane resin dispersions in accordance with the present invention (having polyether segments in the polyester portions of the resin) and for prior art polyester polyurethane resin dispersions (having polyether segments in the polyurethane portions of the resin) appears in Table 1. In Table 1, the examples are grouped for purposes of comparison according to similar methods of preparation.

TABLE 1

| EXAMPLE | DISPERSION PARTICLE SIZE (Nanometers) | WEIGHT AVERAGE MOLECULAR WEIGHT (Daltons) | PERCENT BY WEIGHT MPEG |
| --- | --- | --- | --- |
| 9 | 55 | 20,000 | 13.11 |
| Prior Art D | 180 | 25,000 | 14.7 |
| 11 | 135 | 190,000 | 12.00 |
| 12 | 150 | 105,000 | 12.30 |
| 13 | 190 | 99,400 | 11.95 |
| Prior Art C | 275 | 68,000 | 12.58 |
| 10 | 55 | 70,000 | 14.7 |
| 14 | 180 | 45,000 | 7.9 |
| Prior Art E | 180 | 43,000 | 14.5 |

The laterally stabilized, water-dispersible polyester polyurethane resins of this invention are prepared by reacting a hydroxy-terminated polyester prepolymer having pendant polyether stabilizing groups with a polyisocyanate and a polyol. The hydroxyl-terminated polyester prepolymer is prepared by either of two alternative procedures. In one alternative, an adduct is first prepared of a polyether alcohol and a trifunctional carboxylic acid to form an adduct which contains two free carboxyl groups. This adduct is then subsequently reacted with other polyols and polyacids to form a hydroxyl-terminated polyester prepolymer having pendant polyether stabilizing groups.

In a second alternative, the hydroxyl-terminated polyester prepolymer is prepared by reaction of a mixture of the polyether alcohol, diols, and diacids. A trifunctional alcohol or trifunctional carboxylic acid is added to the reaction mixture to produce some branching and to produce a polyester prepolymer having pendant polyether stabilizing groups.

The polyester polyurethane product resins of this invention are then prepared by reacting the hydroxyl-functionalized polyester prepolymer thus formed with a mixture of a polyisocyanate and a polyol. The stoichiometry of this reaction is controlled to produce an uncapped polyester polyurethane polymer having free isocyanate functionality. This uncapped polymer is then subsequently capped by reaction with a polyol or amino polyol capping reagent. The resulting resins are then dispersed in water and used as the principal resins or as pigment grind resins in water-borne coating compositions.

Hydroxy-Terminated Polyester Prepolymer

In one alternative method of preparing the hydroxy-functionalized polyester prepolymers, an adduct is first formed by reacting between about 3.0 and about 3.5 equivalents of a polyether alcohol per equivalent of a trifunctional carboxylic acid in a suitable unreactive solvent such as toluene under reflux. The reaction is allowed to proceed until analysis of the reaction mixture indicates an acid number corresponding to complete esterification of the polyether alcohol.

While any trifunctional acid may be employed in this step of the process, a preferred trifunctional acid starting material is trimellitic anhydride (TMA). The reaction between the polyether alcohol and TMA is believed to proceed by a process which opens the anhydride ring of TMA to produce an ester adduct having two free carboxylic acid functional groups.

The polyether alcohols employed in preparing the initial adducts are oligomers formed by the alkoxyl-initiated polymerization of epoxides such as ethylene oxide, propylene oxide and the like. The compounds have the general formula

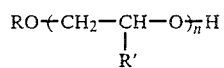

where R is alkyl of from one to four carbon atoms and R' is hydrogen or alkyl of from one to four carbon atoms, and the nominal value of n ranges between 20 and 75. The compounds, when R is methyl and R' is hydrogen (formed by the methoxyl-initiated polymerization of ethylene oxide) are generally known as "MPEG's" (methoxy polyethylene glycols) and are commercially available, for example, from Union Carbide Co. in a variety of molecular weights. The compounds are marketed under the tradenames MPEG XXXX where XXXX is a number indicating the weight average molecular weight. For the purposes of this invention, the preferred polyether alcohols are the MPEGs having weight average molecular weights in the range of between about 1200 and 3000. Particularly preferred are MPEG 1450 and MPEG 2000.

The adduct thus prepared is next reacted with at least one organic compound having two or more reactive hydrogen functional groups to form a polyester prepolymer having a weight per hydroxyl preferably in the range of between about 600 to about 1200. The organic compounds having two or more reactive hydrogen functional groups are selected from diols and diacids, with small amounts of trifunctional alcohols and/or trifunctional carboxylic acids added to the reaction mixture to effect a slight degree of branching in the polyester prepolymer. The mixture of diols, triols, diacids and triacids employed to synthesize the polyester prepolymer preferably contains between about 1.15 to 1.5 equivalents of hydroxyl functionality per equivalent of carboxylic acid functionality. This stoichiometry insures that the polyester prepolymer reaction product is hydroxyl-terminated terminated or hydroxyl functionalized.

The diols and triols used in forming the polyester prepolymer are preferably aliphatic compounds, i.e. compounds having two or more hydroxyl functions per molecule and having a straight-chain, branched-chain, or saturated carbocyclic ring. The aliphatic diols and triols are believed to impart flexibility to the final copolymer. Examples include ethylene glycol, propylene glycol, butylene glycol, neopentyl glycol, trimethylolethane, trimethylolpropane, and similar diols and triols of up to twenty carbon atoms. Similarly, ester polyols formed by esterification of a diol with a hydroxy acid, or triol with a carboxylic acid may also be used. These compounds are characterized by at least two hydroxy groups and one ester group per molecule. Examples include monoesters of diols such as ethylene glycol, propylene glycol, butylene glycol, 1,6-hexanediol, trimethylolethane, trimethylolpropane and the like with hydroxy acids or alkyl-substituted hydroxy acids. Examples of suitable hydroxy acids include hydroxyacetic acid, hydroxypropionic acid, 3-hydroxy-2,2-dimethylpropanoic acid and the like. A preferred ester polyol is the 3-hydroxy-2,2-dimethylpropyl ester of 3-hydroxy-2,2-dimethylpropanoic acid, commercially available as Esterdiol 204 from Union Carbide Company. Further examples include the esterification products of triols such as trimethylolpropane and trimethylolethane with carboxylic acids such as acetic, propionic, butyric acid and the like. Alternatively, the ester polyols may be formed in situ by reaction of the diol and/or triol reagents with diacid reagents employed to make the polyester prepolymer.

The diacids employed to prepare the polyester prepolymer are selected from straight or branched chain aliphatic difunctional carboxylic acids of from six to twenty carbon atoms and aromatic diacids of from eight to twenty carbon atoms. Examples include phthalic acid, iso-phthalic acid, terephthalic acid, and alkyl substituted phthalic acids, and adipic acid. Optionally, small amounts of so-called "dimer fatty acid" may be employed to impart flexibility to the final resin. Processes for preparing a $C_{36}$ dimer fatty acid are well known and form the subject of numerous U.S. Pat. Nos. including 2,482,761; 2,793,220; 2,793,221; and 2,995,121. Alternatively, dimer fatty acid is commercially available as Empol ® 1010 from Emery Chemical Co. $C_{36}$ dimer fatty acid fraction consists essentially of dimer acid ($C_{36}$ dicarboxylic acids) together with amounts of up to 20–22% by weight of $C_{54}$ trimer. However, those skilled in the art refer to this dimer-trimer mixture as "dimer" and this practice is followed herein. The preferred grade contains 97% dimer and 3% trimer. This product can be used in the form in which they are recovered from the polymerization unit or may be given a partial or complete hydrogenation treatment to reduce unsaturation content before being reacted with polyols to form the polyester prepolymers of this invention.

The reaction to form the polyester prepolymer is generally carried out in a suitable unreactive solvent which is capable of forming an azeotrope with water. A preferred solvent is toluene. The reaction is carried out under reflux and the water generated by the esterification reactions is azeotropically removed to drive the reaction to completion. The reaction is allowed to proceed until analysis indicates an acid number of between about 4 to about 10.

In an alternative method of preparing the polyester prepolymer, a mixture of one or more diacids, one or more diols, and a polyether alcohol are reacted in the presence of a small amount of a trifunctional acid or alcohol without first preparing an adduct of a trifunctional carboxylic acid and a polyether alcohol. A trifunctional acid such as trimellitic anhydride or a trifunctional alcohol such as trimethylolethane or trimethylolpropane is added directly to the mixture of reagents employed in the synthesis of the polyester prepolymer to achieve a slight degree of branching. Preferably the stoichiometric ratio of triol or triacid to polyether alcohol employed ranges between about 3 equivalents to about 4 equivalents of trifunctional acid or alcohol per mole of polyether alcohol. The diacids, diols, triols, and polyether alcohols which are used in preparing the polyester prepolymers by this method are those described above, with similar reaction conditions being employed.

The polyester prepolymer thus formed comprises a polyester backbone with pendant polyether groups randomly distributed along the backbone and linked into the backbone through the trifunctional carboxylic acid residues. The preferred weight per hydroxyl group of the hydroxyl-terminated polyester prepolymer is between about 600 and 1200, and the polyester prepolymer has a preferred acid number of less than about 10.

Uncapped Polyester Polyurethane Polymer

The polyester prepolymer thus formed is then reacted with a polyisocyanate and a polyol in a ratio of about 1.1 to about 1.5 equivalents of isocyanate functionality per equivalent of hydroxyl functionality to form a polyester polyurethane resin having free isocyanate functionality. The polyisocyanates which are employed to form the polyester polyurethane resins of this invention are selected from any polyisocyanate, i.e. any compound containing at least two isocyanate functional groups. The polyisocyanate may be a triisocyanate such as 1,2,4-benzene triisocyanate, polymethylene polyphenyl isocyanate, or may be the trimerized isocyanurate of an alkyl diisocyanate such as the isocyanurate of 1,6-hexamethylene diisocyanate. The polyisocyanate is preferably a diisocyanate, for example, hydrocarbon diisocyanates or substituted hydrocarbon diisocyanates. Examples of compounds which may be utilized include, but are not limited to p-phenylene diisocyanate, biphenyl 4,4'-diisocyanate, meta-xylylene diisocyanate, toluene diisocyanate (TDI), 3,3'-dimethyl-4,4'-biphenylene diisocyanate, 1,4-tetramethylene diisocyanate, 1,6-hexamethylene diisocyanate, 2,2,4-trimethylhexane-1,6-diisocyanate, 1,3-bis-[2-(2-(isocyanato)propyl]benzene (also known as tetramethylxylyldiisocyanate, TMXDI), methylene bis-(phenyl isocyanate), 1,5-naphthalene diisocyanate, bis-(isocyanatoethyl fumarate), isophorone diisocyanate (IPDI), and methylene bis-(4-cyclohexylisocyanate). There can also be employed isocyanate-terminated adducts of diols such as ethylene glycol or 1,4-butylene glycol, etc. These compounds are formed by reacting more than one mole of diisocyanate, such as those mentioned above, with one mole of diol to form a longer chain diisocyanate. Alternatively, the isocyanate-terminated diol adduct may be formed in situ by addition of the diol together with the diisocyanate to the reaction mixture.

It is preferred to employ an aliphatic or cycloaliphatic diisocyanate or aliphatic isocyanurate since it has been found that these provide better color stability in the finished coating. Examples include 1,6-hexamethylene diisocyanate, the isocyanurate of 1,6-hexamethylene diisocyanate, 1,4-butylene diisocyanate, methylene bis-(4-cyclohexyl isocyanate), and isophorone diisocyanate (IPDI). However, aromatic diisocyanates in which the isocyanate groups are not directly attached to the aromatic ring such as TMXDI and meta-xylylenediisocyanate may also be used.

The reaction between the polyester prepolymer and polyisocyanate is carried out in a suitable polar unreactive solvent such as a ketone of suitable boiling point under reflux. A preferred solvent for this stage of the process is methyl propyl ketone. The reaction is allowed to proceed until analysis indicates an —N=C=O meq/g of between about 0.10 and about 0.50. A capping reagent in then added and the reaction is allowed to proceed until all remaining isocyanate functionality is consumed. Suitable capping agents for this purpose include diols or triols as described above or a amine polyol. Suitable diols for capping the free isocyanate functionality of the polyurethane macromonomer are straight-chain or branched chain aliphatic (i.e. saturated) diols of from three to twenty carbon atoms. Examples include ethylene glycol, propylene glycol, butylene glycol, neopentyl glycol, 1,6-hexanediol, and the like. Straight-chain or branched-chain amino polyols of from two to twenty carbon atoms may also be employed as capping agents. By the term "amino polyol" as used throughout this specification and the appended claims is meant an organic compound having one primary or secondary amine nitrogen atom and one or more hydroxyl groups. Examples of amine polyols which may be used to cap the polyester polyurethane polymers of this invention include ethanolamine, diethanolamine, 4-(2-hydroxyethyl)morpholine, and the like. The product of the capping reaction is a capped polyester polyurethane copolymer having the stabilizing pendant polyether side chains discussed above, and terminal hydroxy functionality deriving, in part, from the polyols and amino polyols employed in the capping reaction. This hydroxyl functionality provides sites for cross-linking with, for example, an alkylated melamine cross-linking agent when mixed with such a cross-linking agent in a coating formulation and subjected to thermal cross-linking conditions to form a coating film.

Coating Formulations

The water-miscible laterally stabilized polyester polyurethane polymers of this invention, prepared as described above can be employed as the principal or binder resin and/or as the pigment grind resin in base coat paint formulations for automotive applications. When employed as principal resins, the resins are combined, in amounts generally ranging between about 10% by weight and about 40% by weight, based on total solids content of the base coat formulation, into water dispersible base coat compositions which are sprayed er electrostatically deposited onto metal or plastic substrates, for example, automotive vehicle bodies. In general, a polyester polyurethane resin formulated as described above is mixed with an aminoplast resin, a pigment paste, water, a small amount of organic solvent if desired, a rheology control agent, leveling and flow additives, fillers, stabilizers, wetting agents, dispersing agents, adhesion promoters, etc.

Aminoplast resin suitable for use as cross-linking agents in the base coat formulations are aldehyde condensation products of melamine, urea, and similar compounds. The products obtained from the reaction of formaldehyde with melamine, urea, or benzoguanamine are most common and are preferred. However, condensation products of other amines and amides can also be employed, for example, aldehyde condensation products with triazines, diazines, triazoles, guanidines, guanamines, and alkyl and aryl substituted derivatives of such compounds including alkyl and aryl substituted ureas and alkyl and aryl substituted melamines. Examples include N,N-dimethyl urea, benzourea, dicyandiamide, formoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 2,4,6-triethyltriamino-1,3,5-triazine, and the like. Particularly preferred are the alkylated melamine cross-linking resins sold under the tradename Cymel ® resins by American Cyanamide Corp.

The pigment paste comprises a pigmenting agent (which may or may not additionally contain flake pigmenting agents such as aluminum flake, mica flake, or metal oxide encapsulated mica flake), and a pigment grind resin.

Rheology control agents preferably incorporated into the base coat formulation help to control the viscosity of the resulting composition and are incorporated in amounts which prevent sagging or running after a base coat layer is sprayed onto a vertical substrate surface such as a motor vehicle body. The direct result of incorporating a rheology control agent is to provide flow control, body, and sprayability in the base coat formulation. Another purpose for the inclusion of a rheology control agent in the base coat formulations is to allow for the application of thicker base coat layers during spraying, permitting better coverage and hiding of the substrate. The sprayed coatings containing these rheology control agents also exhibit better orientation of flake pigments such as aluminum or micaceous flakes which may be incorporated into the base coat formulation to provide a "metallic" sparkle effect.

Rheology control agents which can be used in embodiments of the present invention include fumed silica compounds, and hectorite and bentonite clays. Preferred fumed silica compounds are the hydrophobic fumed silicas such as Aerosil R972, available from Degussa Corporation, Frankfort, West Germany). Another preferred rheology control agent for base coat compositions of the present invention is a synthetic sodium lithium magnesium silicate hectorite clay. An example of one such clay is Laponite RD, available from Laporte, Inc., Saddlebrook, NJ. The rheology control agent may also comprise mixtures of the above-mentioned agents.

The rheology control agent may comprise from 0% to about 20% by weight of the basecoat composition, and generally comprises between about 1% by weight and 5% by weight of the final base coat composition. In general, the particle size of the rheology control agent plays a role in the overall thixotropic properties of the base coat formulations. The rheology control agents included in embodiments of this invention are suspended in the formulations and are believed to function, at least in part, through coulombic or electrostatic interactions. In general, the particle size ranges from less than about 0.01 microns to about 200 microns. The particle size of the rheology control agent is selected to impart the desired flow, body, and sprayability of the finished base coat formulation. In most instances, the preferred particle size ranges between about 1 micron and about 10 microns.

Additional agents may also be included in the base coat formulations of this invention, for example surfactants, fillers, stabilizers, wetting agents, dispersing agents, adhesion promoters, etc. While agents serving each of these functions are well known in the art, the amounts used must be carefully controlled to avoid adversely affecting the coating and its drying characteristics.

When employed as a pigment grind resin, the polyurethane/acrylic graft copolymers of this invention are combined with one or more pigmenting agents known in the trade by conventional mixing, and then ground by ball milling, sand milling, passage through an attritor, or other known technique until the desired pigment particle size distribution is achieved. The paste is then diluted with water, if needed, to adjust the paste to the desired viscosity, and employed in base coat formulations as described above. In general, the resin will comprise from about 30% by weight to about 80% by weight of the total solids content of the pigment paste, preferably from about 40% to about 70% by weight. The viscosity of the final base coat formulation is adjusted to the desired value by the addition of water.

The base coat compositions described hereinabove are applied to a metal or plastic substrate in one or more coats using, for example, an air atomized spray gun such as a Binks Model 60 spray gun, available from the Binks Manufacturing Corp., Franklin Park, IL, or by using other conventional spraying means. The base coat compositions are generally sprayed at a pressure of 50–80 psi (344.7–551–6 kPa), at a relative humidity of about 50% to 90% (preferably about 60% to 80%), and at temperatures between about 70°–90° F. (21.1°–32.2° C.)

After deposition of the base coat compositions, the base coat layer is flash dried at a temperature of between room temperature and about 145° F. (62.8° C.), preferably about 120° F. (48.9° C.). A second basecoat layer may be applied over the first without drying (flash off) or, alternatively, a clear coat layer may be deposited over the first flashed base coat layer. Any number of well known clear top coat compositions known in the art may be used to apply the top coat layer. For example a high solids solvent-borne top coat composition comprising a so-called monomeric highly alkylated melamine such as Cymel ® 303 (available from American Cyanamid Company, Wayne, NJ) and a strong acid catalyst such as p-toluene sulfonic acid may be used. Alternatively, a top coat formulation utilizing a so-called polymeric less highly alkylated melamine such as Cymel ® 327 may be used.

After application of the clear coat layer over the previously applied base coat layer, the multi-layer coating is then baked to cross link the polymeric vehicles and to drive the small amounts of water and organic solvents from the layers. A preferred baking step involves heating the coated substrate for a period of from about 10 to about 60 minutes at a temperature of between about 150° F. (65.5° C.) and 300° F. (148.9° C.). This baking step cures the multi-layer coating to an attractive, glossy, hard, durable film.

The following examples are provided to enable one skilled in the art to practice the present invention. However, these examples are merely illustrative of the invention and are not to be read as limiting the scope of the invention as it is defined by the appended claims.

PREPARATION OF INTERMEDIATES

Example 1

Preparation of Trimellitic Anhydride-MPEG 1450 Adduct

A mixture of 1450 g of methoxypolyethylene glycol (MPEG 1450, available from Union Carbide), 192 g of trimellitic anhydride (TMA), and 100 g of toluene were placed in a 5-liter flask fitted with a stirrer, condenser, and Dean Stark trap. The trap was filled with toluene and the flask contents were heated to about 175° C. The reaction mixture was allowed to react at a temperature of between about 175° C. and 178° C. until analysis of an aliquot sample indicated an acid number of about 66 to 68. The toluene was removed from the reaction mixture under vacuum and the cooled flask contents were stored for later use.

Example 2

Preparation of Trimellitic Anhydride-MPEG 2000 Adduct

The method of Example 1 was repeated using a mixture of 2000 g of MPEG 2000 (available from Union Carbide), 192 g of trimellitic anhydride (TMA), and 100 g of toluene. The acid number of the resulting adduct was 48.

Example 3

Preparation of Hydroxyl-Terminated Polyester Prepolymer

A mixture of 685 g of neopentyl glycol, 332 g of iso-phthalic acid, 438 g of adipic acid, 381 g of the TMA-MPEG adduct of Example 1, and 40 g of toluene were placed in a three-neck flask fitted with a stirrer, condenser and Dean Stark trap.

The trap was filled with toluene and the flask contents slowly heated to about 240° C. The flask contents were allowed to react at a temperature of between about 240° C. and 245° C. until analysis of an aliquot sample indicated an acid number of about 4 to 10. The residual toluene was removed under vacuum and the flask contents were stored for later use.

The polyester prepolymer product was found to have an acid number of 7.5 with an average molecular weight of about 3000 Daltons and a melting point of 70° C. The prepolymer contained 18.32% by weight MPEG and had a weight per hydroxyl of about 600.

Example 4

Preparation of Hydroxyl-Terminated Polyester Prepolymer

The method of Example 3 was repeated using a mixture of 815 g of 1,6-hexanediol, 1228 Empol ® 1010 dimer fatty acid (available from Emery Chemical Co.), 477 g of iso-phthalic acid, 555 g of the TMA-MPEG adduct of Example 2, and 50 g of toluene. The reaction was carried out at a temperature of about 210° C. to about 215° C.

The polyester prepolymer product was found to have an acid number of 4.5 with an average molecular weight of about 3500 Daltons and a melting point of 50° C. The prepolymer contained 16.47% by weight MPEG and had a weight per hydroxyl of about 700.

Example 5

Preparation of Hydroxyl-Terminated Polyester Prepolymer

The procedure of Example 1 was followed using a mixture of 980 g of neopentyl glycol, 576 g of adipic acid, 582 g of iso-phthalic acid, 504 g of the TMA-MPEG adduct of Example 2, and 50 g of toluene. The final product had an acid number of 3.5 and contained 17.41% by weight MPEG. The weight per hydroxyl was about 675.

Example 6

Preparation of Slightly Branched Polyester Prepolymer

A slightly branched polyester prepolymer was prepared by reacting a mixture of alcohols (MPEG 2000, and neopentyl glycol) with a mixture of diacids (adipic acid and iso-phthalic acid), using a small amount of trimellitic anhydride (TMA) to effect the branching. A mixture of 1227 g of neopentyl glycol, 721 g of adipic acid, 744 g of iso-phthalic acid, 582 g of MPEG 2000 (available from Union Carbide Co.), 56 g of trimellitic anhydride, and 25 g of toluene was placed in a flask fitted with a stirrer, condenser, and Dean Stark trap. The trap was filled with toluene and the mixture was gradually heated to a temperature of about 240° C. The mixture was allowed to react at temperatures ranging between about 240° C. and about 245° C. until analysis of an aliquot sample indicated an acid number of about 4 to 10. The toluene was removed from the reaction mixture under vacuum and the cooled product collected and stored for later use. The prepolymer was found to have an acid number of 4.5, about 17.48% by weight MPEG content, and a weight per hydroxyl of 700.

Example 7

Preparation of Slightly Branched Polyester Prepolymer

A slightly branched polyester prepolymer was prepared by reacting a mixture of alcohols (neopentyl glycol and MPEG 2000) with a mixture of diacids (adipic acid and iso-phthalic acid), employing a small amount of trimethylpropane the effect the branching. The method of Example 6 was used, starting with a mixture of 1216 g of neopentyl glycol, 580 g of MPEG 2000, 794 g of adipic acid, 776 g of iso-phthalic acid, 42 g of trimethylolpropane, and 20 g of toluene.

The prepolymer was found to have an acid number of 6.3, to contain 17.02% by weight MPEG segments, and had a weight per hydroxyl of about 710.

Example 8

Preparation of a Flexibilized. Slightly Branched Polyester Prepolymer

A more flexible, slightly branched polyester prepolymer was prepared using the method of Example 6 by reacting a mixture of alcohols (1,6-hexanediol and MPEG 2000) with a mixture of diacids (Empol® 1010 dimer fatty acid and iso-phthalic acid), employing a small amount of trimethylolpropane the effect branching. Increased flexibility in the resulting polyester prepolymer derived from the replacement of a portion of the iso-phthalic acid with the dimer fatty acid, and the use of 1,6-hexanediol for a portion of the alcohol.

A mixture of 1098.8 g of Empol® 1010 dimer fatty acid, 312.2 g of iso-phthalic acid, 260 g of MPEG 2000, 602.2 g of 1,6-hexanediol, 18 g of trimethylolpropane, and 50 g of toluene were placed in a flask fitted with a stirrer, condenser and Dean Stark trap. The trap was filled with toluene, and the reaction mixture was heated to a temperature of about 210° C. The mixture was allowed to react at about 210° C. to about 215° C. until analysis of an aliquot sample indicated an acid number of about 4 to 10. The toluene was stripped from the reaction mixture under vacuum and the cooled product was collected and stored for later use. The polyester prepolymer product had an acid number of The polyester prepolymer product had an acid number of 7.5, contained about 11.35% by weight MPEG segments, and had a weight per hydroxyl of about 675

PREPARATION OF POLYESTER POLYURETHANE POLYMERS

Example 9

Preparation of Nonionic Polyester Polyurethane Resin Dispersion

A mixture of 500 g of the polyester prepolymer of Example 3, 19.5 g of neopentyl glycol, 139 g of isophorone diisocyanate, and 115 g of methyl propyl ketone were placed in a 5-liter flask fitted with a stirrer, condenser and addition funnel. This mixture was heated to a temperature of about 103° C. and allowed to react at temperatures ranging between about 103° C. and 105° C. until analysis of an aliquot sample indicated an —N═C═O meq/g of about 0.45.

At this point, a mixture of 24 g of trimethylolpropane and 16 g of neopentyl glycol was added to the reaction mixture and the reaction allowed to proceed until analysis indicated the absence of isocyanate functionality in the reaction mixture. Ethylene glycol monobutyl ether (180 g) was added to the mixture which was allowed to cool to about 70° C. At that point, 1000 g of deionized water was added under high speed agitation to achieve the aqueous dispersion of the polyester polyurethane polymer. The dispersion was filtered into a plastic container and stored for later use.

The dispersion contained about 35% by weight non-volatile solids, had a pH of 4.35 and a viscosity on the Gardner-Holt scale of Z2 to Z3. The dispersion particle size was 55 nanometers and had a weight average molecular weight of about 20,000 Daltons. The dispersion contained 13.11% by weight MPEG segments based on the total weight of solids in the dispersion.

Example 10

Preparation of Polyester Polyurethane Resin Dispersion

A mixture of 880 g of the polyester prepolymer of Example 4, 103 g of isophorone diisocyanate, and 170 g of methyl propyl ketone were placed in a 5-liter flask fitted with a stirrer, condenser and addition funnel. This mixture was heated to a temperature of about 105° C. and allowed to react at temperatures ranging between about 105° C. and 108° C. until analysis of an aliquot sample indicated the absence of isocyanate functionality in the reaction mixture. Ethylene glycol monobutyl ether (250 g) was added to the mixture which was allowed to cool to about 70° C. At that point, 1600 g of deionized water was added under high speed agitation to achieve the aqueous dispersion of the polyester polyurethane polymer. The dispersion was filtered into a plastic container and stored for later use.

The dispersion contained about 32.7% by weight non-volatile solids, had a pH of 4.6 and a viscosity on the Gardner-Holt scale of P to Q. The dispersion particle size was 50 nanometers and had a weight average molecular weight of about 70,000 Daltons. The dispersion contained 14.74% by weight MPEG segments based on the total weight of solids in the dispersion.

Example 11

Preparation of Polyester Polyurethane Resin Dispersion

A mixture of 675 g of the polyester prepolymer of Example 5, 18 g of trimethylolpropane, , 13 g of neopentyl glycol, 217 g of isophorone diisocyanate, and 160 g of methyl propyl ketone were placed in a 5-liter flask fitted with a stirrer, condenser and addition funnel. This mixture was heated to a temperature of about 105° C. and allowed to react at temperatures ranging between about 105° C. and 108° C. until analysis of an aliquot sample indicated an —N=C=O meq/g of about 0.25.

At this point, 34.7 g of trimethylolpropane was added to the reaction mixture and the reaction allowed to proceed until analysis indicated the absence of isocyanate functionality in the reaction mixture. Ethylene glycol monobutyl ether (290 g) was added to the mixture which was allowed to cool to about 70° C. At that point, 1680 g of deionized water was added under high speed agitation to achieve the aqueous dispersion of the polyester polyurethane polymer. The dispersion was filtered into a plastic container and stored for later use.

The dispersion contained about 30% by weight non-volatile solids, had a pH of 4 and a viscosity on the Gardner-Holt scale of X to Y. The dispersion particle size was 135 nanometers and had a weight average molecular weight of about 190,800 Daltons. The dispersion contained 12% by weight MPEG segments based on the total weight of solids in the dispersion.

Example 12

Preparation of Polyester Polyurethane Resin Dispersion

A mixture of 675 g of the polyester prepolymer of Example 6, 1S g of trimethylolpropane, 13 g of neopentyl glycol, 217 g of isophorone diisocyanate, and 160 g of methyl propyl ketone were placed in a 5-liter flask fitted with a stirrer, condenser and addition funnel. This mixture was heated to a temperature of about 105° C. and allowed to react at temperatures ranging between about 105° C. and 108° C. until analysis of an aliquot sample indicated an —N=C=O meq/g of about 0.34.

At this point, 40 g of trimethylolpropane was added to the reaction mixture and the reaction allowed to proceed until analysis indicated the absence of isocyanate functionality in the reaction mixture. Ethylene glycol monobutyl ether (358 g) was added to the mixture which was allowed to cool to about 70° C. At that point, 2158 g of deionized water was added under high speed agitation to achieve the aqueous dispersion of the polyester polyurethane polymer. The dispersion was filtered into a plastic container and stored for later use.

The dispersion contained about 26.5% by weight non-volatile solids, had a pH of 4.06 and a viscosity on the Gardner-Holt scale of Z6 to Z7. The dispersion particle size was 150 nanometers and had a weight average molecular weight of about 105,500 Daltons. The dispersion contained 12.3% by weight MPEG segments based on the total weight of solids in the dispersion.

Example 13

Preparation of Polyester Polyurethane Resin Dispersion

A mixture of 675 g of the polyester prepolymer of Example 7, 18 g of trimethylolpropane, 13 g of neopentyl glycol, 217 g of isophorone diisocyanate, and 160 g of methyl propyl ketone were placed in a 5-liter flask fitted with a stirrer, condenser and addition funnel. This mixture was heated to a temperature of about 105° C. and allowed to react at temperatures ranging between about 105° C. and 108° C. until analysis of an aliquot sample indicated an —N=C=O meq/g of about 0.29.

At this point, 38 g of trimethylolpropane was added to the reaction mixture and the reaction allowed to proceed until analysis indicated the absence of isocyanate functionality in the reaction mixture. Ethylene glycol monobutyl ether (359 g) was added to the mixture which was allowed to cool to about 70° C. At that point, 1730 g of deionized water was added under high speed agitation to achieve the aqueous dispersion of the polyester polyurethane polymer. The dispersion was filtered into a plastic container and stored for later use.

The dispersion contained about 30% by weight non-volatile solids, had a pH of 4.1 and a viscosity on the Gardner-Holt scale of Z6 to Z7. The dispersion particle size was 190 nanometers and had a weight average molecular weight of about 99,400 Daltons. The dispersion contained 11.95% by weight MPEG segments based on the total weight of solids in the dispersion.

Example 14

Preparation of Polyester Polyurethane Resin Dispersion

A mixture of 849.6 g of the polyester prepolymer of Example 21.2, 18 g of trimethylolpropane, 24.8 g of neopentyl glycol, 294 g of isophorone diisocyanate, and 210 g of methyl propyl ketone were placed in a 5-liter flask fitted with a stirrer, condenser and addition funnel. This mixture was heated to a temperature of about 105° C. and allowed to react at temperatures ranging between about 105° C. and 108° C. until analysis of an aliquot sample indicated an —N=C=O meq/g of about 0.13.

At this point, 29.2 g of diethanolamine was added to the reaction mixture and the reaction allowed to proceed until analysis indicated the absence of isocyanate functionality in the reaction mixture. Ethylene glycol monobutyl ether (446.4 g) was added to the mixture which was allowed to cool to about 70° C. At that point, 1807.2 g of deionized water was added under high speed agitation to achieve the aqueous dispersion of the polyester polyurethane polymer. The dispersion was filtered into a plastic container and stored for later use.

The dispersion contained about 37% by weight non-volatile solids, had a pH of 4.9 and a viscosity on the Gardner-Holt scale of Z1 to Z2. The dispersion particle size was 180 nanometers and had a weight average molecular weight of about 45,000 Daltons. The dispersion contained 7.9% by weight MPEG segments based on the total weight of solids in the dispersion.

Example 15

Preparation of Water-Borne White Base Coat Paint Formulation

Water-borne white base coat paint formulations were prepared using the resin dispersions of Examples 10 (Paint Formulation 15A) and 14 (Paint Formulation 15B).. In both cases the resin served as both the principal binder resin and as the pigment grind resin. The pigmenting agent was rutile titanium dioxide (R960, available from the E.I. duPont ne Nemours Co.).

| Pigment Grind - 4.9/1 Pigment-to-Binder Ratio | | |
|---|---|---|
| | Paint Formulation 15A | Paint Formulation 15B |
| Part 1 | | |
| Resin of Example 10 | 346.5 g | — |
| Resin of | — | 306.2 g |

-continued

| Pigment Grind - 4.9/1 Pigment-to-Binder Ratio | | |
|---|---|---|
| | Paint Formulation 15A | Paint |
| Example 14 Part 2 | | |
| R960 white pigment | 556.3 g | 556.3 g |
| Part 3 | | |
| Deionized water | 180.0 g | 220.0 g |

Part 1 was placed in a lined container and Parts 2 and 3 were added with stirring. When the mixture was homogeneous, a cup of 1 mm steel shot was placed in the container. The container was placed on a Red Devil Shaker Mill and shaken until a fineness of grind (FOG) of 0 to 10 on the Hegman scale was achieved. The mixture was then transferred to a clean container and the following further ingredients added.

| Paint Formulation - 1/1 Pigment-to-Binder Ratio | | |
|---|---|---|
| | Paint Formulation 15A | Paint |
| Part 4 Formulation 15B | | |
| Dispersion of Example 10 | 844.4 g | — |
| Dispersion of Example 14 | — | 746.2 g |
| Cymel ® 303 cross-linker* (98% solids) | 167.5 g | 167.5 g |
| Part 5 | | |
| Blocked p-toluene sulfonic acid catalyst (25% solids) | 22.3 g | 22.3 g |
| Part 6 | | |
| Laponite ®** rheology control agent (2% aqueous dispersion) | 280 g | 280 g |

*(Available from American Cyanamid, Polymer Products Div., One Cyanamid Plaza, Wayne, NJ 07470.)
**(Available as Laponite ® RD from Laporte, Inc., Saddlebrook, NJ.)

Part 4 was added to the pigment grind mixture under agitation. Part 5 was next added, followed after a few minutes by Part 6. The resulting mixture was thoroughly mixed and then diluted with deionized water to a solids content of about 40% by weight and a viscosity of about 35 seconds in a #2 Fisher cup.

Testing of Water-Borne White Base Coate Paint Formulations

The white base coat paint formulations of Examples 15A and 15B were spray applied by conventional techniques to a flexible substrate to a thickness of about 1 mil (0.025 mm). The coated panels were baked at 250° F. (115° C.) for thirty minutes to cure the coating. The cured panels were cut into 1" (2.54 cm)×4" (10.16 cm) which were then placed in a freezer at 0 C for a twenty-four hour period. The cold panels were then bent over a 2" (5.08 cm) diameter mandrel and examined for cracks or other signs of coating failure. All panels for both coatings of Examples 15A and 15B passed this test with no indications of coating failure.

Example 16

Preparation of Water-Borne Silver Metallic Base Coat paint Formulations

Water-reducible silver metallic base coat paint formulations were prepared using both the resins of the present invention and those of the prior art (prepared as described below in Prior Art Examples C and D).

Pigment Slurry

The following ingredients were combined and mixed until a homogeneous mixture was obtained:

| | |
|---|---|
| Aluminum pigment paste (60% solids) | 1450.2 g |
| Cymel ® 303 melamine resin | 1500 g |
| Ethylene glycol monobutyl ether | 780 g |

| Paint Formulation - 0.2/1 Pigment-to-Binder Ratio | | | | | | |
|---|---|---|---|---|---|---|
| | Base Coat Formulation (Grams) | | | | | |
| Ingredient | 16A | 16B | 16C | 16D | 16E | 16F |
| Part 1 | | | | | | |
| Pigment slurry | 621.7 | 621.7 | 621.7 | 621.7 | 621.7 | 621.7 |
| Dispersion Example 9 | 1640.0 | — | — | — | — | — |
| Dispersion Example 11 | — | 1913.3 | — | — | — | — |
| Dispersion Example 12 | — | — | 2166.0 | — | — | — |
| Dispersion Example 13 | — | — | — | 1913.3 | — | — |
| Dispersion Prior Art Example C | — | — | — | — | 1816.5 | — |
| Dispersion Prior Art Example D | — | — | — | — | — | 1793.8 |
| Part 2 | | | | | | |
| Laponite ® (2% in water) | 1600 | 1600 | 1600 | 1600 | 1600 | 1600 |
| Part 3 | | | | | | |
| Blocked p-TSA (25% solids) | 70.0 | 70.0 | 70.0 | 70.0 | 70.0 | 70.0 |

The ingredients of Part 1 are thoroughly mixed. Parts 2 and 3 are added with stirring and the resulting mixture is stirred until homogeneous. Deionized water is added until the mixture had a non-volatile solids content of about 20% by weight and a viscosity of about 25 to 30 seconds in a #2 Fisher cup.

Appearance Testing of Water-Borne Silver Metallic Base Coat Paint Formulations The water-borne metallic silver base coat compositions of Examples 16A through 16D above, in accordance with the present invention, were applied to steel test panels and evaluated for appearance. For purposes of comparison, prior art base coat compositions according to Examples 16E and 16F were similarly evaluated.

In each case, a layer of base coat was spray applied to a thickness of about 0.5 mils over a cold rolled steel panel which had been previously coated with an electrocoat primer layer. The wet panels were flash dried at 110° F. (43.3° C.) for five minutes. A high solids acrylic clear coat, cross-linked with a fully alkylated monomeric melamine cross-linking agent was then applied over the flashed base coat layer and the clear coated panels cured by baking at 250° F. (121° C.) for thirty minutes.

The appearance of the coated panels was then evaluated by measuring the reflectance with a Datacolor Model GPX-111 goniophotometer (Ahiba, Inc., Charlotte, NC 28217). This device illuminates the measured surface at an incident angle of 45° and simultaneously measures L* (value) and a* and b* (hue) of light reflected at angles of 25°, 45°, and 70° from the specular angle (90° away from the illuninating beam). The L* values at these three angles were measured for several panels which were coated with paint formulations in accordance with the present invention (Examples 16A through 16D) and for panels coated with pain formulations made in accordance with the teachings of the prior art (Examples 16E and 16F). The data from these tests appear in Table 2.

The Table reports a parameter "C" which is derived from the measured data by the following equation:

$$C = \frac{L^*_{25°} - L^*_{45°}}{L^*_{45°} - L^*_{70°}}$$

The value of C indirectly incorporates both a measure of the ratio of face brightness to flop brightness and a measure of the depth of flop or "travel." Depth of flop or travel is the rate at which the coated surface is seen to darken as the angle of view is changed from perpendicular to a larger angle of incidence. Larger values of C are thus indicative of better metallic effect.

A so-called "metallic" effect is achieved in coating systems by the incorporation of reflective particulates such as aluminum flake or mica flake throughout the base coat layer, with best effect achieved when the particles are distributed uniformly throughout the base coat layer and the reflective faces of the flake particles are oriented more or less parallel to the base coat layer surface. When the desired particle orientation is achieved in a metallic finish coating, there is a large difference between the reflectance from the coated substrate when viewed face on (face brightness) and when viewed at a large angle of incidence (flop). A large face-to-flop reflectance ratio for a coating produces the most desirable aesthetic effect. This property relates directly to the ability of the resin system making up the base coat layer to assist in the proper orientation of the reflective particulates during drying and curing of the base coat layer.

TABLE 2

| Panel | Formulation | C |
|---|---|---|
| 1 | Silver metallic - Example 16A | 204 |
| 2 | Silver metallic - Example 16B | 196 |
| 3 | Silver metallic - Example 16C | 188 |
| 4 | Silver metallic - Example 16D | 178 |
| 5 | Prior art silver metallic Example 16E | 176 |
| 6 | Prior art silver metallic Example 16F | 173 |

As can be seen by the data presented in Table 2, the base coat layers of Examples 16A–16D of the present invention had better face-to-flop ratios than those of the prior art, with significant differences from the prior art in the cases of Examples 16A and 16B.

Adhesion Testing

In another test, panels 1–6 above which had received both a base coat layer and a clear coat layer were subjected to conditions of 100% relative humidity and 100° F. (37.8° C.) temperature for a period of ten days. After this treatment, each of the panels was scribed with an awl to produce a large "X" on the panel, cutting through the coating layers to the bare substrate metal. A piece of adhesive tape was pressed over the scribe mark, and pulled away. Removal of any of the coating layers was considered adhesive failure. The results of the adhesion tape-pull tests are given in Table 3.

TABLE 3

| Panel | Results of Adhesion Tape-Pull Test |
|---|---|
| 1 | Pass |
| 2 | Pass |
| 3 | Pass |
| 4 | Pass |
| 5 | Pass |
| 6 | Pass |

PREPARATION OF COMPARATIVE EXAMPLES IN ACCORDANCE WITH THE TEACHINGS OF THE PRIOR ART

Prior Art Example A

Preparation of Polyester Prepolymer

Using the method of Example 5, a mixture of 1615 g of neopentyl glycol, 1180 g of adipic acid, 850 g of iso-phthalic acid and 50 g of toluene was reacted to form a polyester prepolymer having an acid number of 5 and a weight per hydroxyl of 620.

Prior Art Example B

Preparation of Polyester Prepolymer

Using the method of Example 4, a mixture of 1045.3 g of Empol® 1010 dimer fatty acid, 300 g of iso-phthalic acid, 557 g of 1,6-hexanediol, and 45 g of toluene was reacted to form a polyester prepolymer having an acid number of 5 and a weight per hydroxyl of 775.

Prior Art Example C

Preparation of Polyester Polyurethane Resin Dispersion

A mixture of 581 g of the polyester prepolymer of Prior Art Example A, 110 g of MPEG 2000, 25 g of trimethylolpropane, 205 g of isophorone diisocyanate, and 159 g of methyl propyl ketone were placed in a flask fitted with a stirrer, condenser, and addition funnel. The mixture was heated to about 105° C. and allowed to react at this temperature until analysis of an aliquot sample indicated an —N═C═O meq/g of about 0.23. At that point, 23.3 g of neopentyl glycol was added and the resulting mixture allowed to react until analysis indicated the absence of isocyanate functionality. Monobutyl ether of ethylene glycol (300 g) was added and the mixture was cooled to about 70° C. Deionized water (1585 g) was added with high speed agitation, and the resulting dispersion was filtered into a container and stored for later use.

The dispersion contained about 31.6% by weight non-volatile solids, and had a viscosity on the Gardner-Holt scale of E to F. The dispersion particle size was 275 nanometers and had a weight average molecular weight of about 68,000 Daltons. The dispersion contained 12.58% by weight MPEG segments based on the total weight of solids in the dispersion.

Prior Art Example D

Preparation of Polyester Polyurethane Resin Dispersion

A mixture of 304.5 g of the polyester prepolymer of Prior Art Example A, 70.3 g of MPEG 1450, 6.65 g of trimethylolpropane, 1.12 g of neopentyl glycol, 85.9 g of isophorone diisocyanate, and 82.5 g of methyl propyl ketone were placed in a flask fitted with a stirrer, condenser, and addition funnel. The mixture was heated to about 105° C. and allowed to react at this temperature until analysis of an aliquot sample indicated an —N=C=O meq/g of about 0.18. At that point, 8.7 g of trimethylolpropane was added and the resulting mixture allowed to react until analysis indicated the absence of isocyanate functionality. Monobutyl ether of ethylene glycol (120.5 g) was added and the mixture was cooled to about 70° C. Deionized water (807.5 g) was added with high speed agitation, and the resulting dispersion was filtered into a container and stored for later use.

The dispersion contained about 32% by weight non-volatile solids, and had a viscosity on the Gardner-Holt scale of Z1 to Z2. The dispersion particle size was 180 nanometers and had a weight average molecular weight of about 25,000 Daltons. The dispersion contained 14.7% by weight MPEG segments based on the total weight of solids in the dispersion.

Prior Art Example E

Preparation of Polyester Polyurethane Resin Dispersion

A mixture of 955 g of the polyester prepolymer of Prior Art Example B, 210 g of MPEG 2000, 19.1 g of trimethylolpropane, 234 g of isophorone diisocyanate, and 246 g of methyl propyl ketone were placed in a flask fitted with a stirrer, condenser, and addition funnel. The mixture was heated to about 105° C. and allowed to react at this temperature until analysis of an aliquot sample indicated an —N=C=O meq/g of about 0.21. At that point, a mixture of 12.9 g of trimethylolpropane and 16.5 g of neopentyl glycol was added and the resulting mixture allowed to react until analysis indicated the absence of isocyanate functionality. Monobutyl ether of ethylene glycol (381 g) was added and the mixture was cooled to about 70° C. Deionized water (2066 g) was added with high speed agitation, and the resulting dispersion was filtered into a container and stored for later use. The dispersion contained about 35% by weight non-volatile solids, and had a viscosity on the Gardner-Holt scale of J to K. The dispersion particle size was 175 nanometers and had a weight average molecular weight of about 43,000 Daltons. The dispersion contained 14.5% by weight MPEG segments based on the total weight of solids in the dispersion.

I claim:

1. A water-dispersible, laterally stabilized polyester polyurethane resin which is the reaction product of
    (a) at least one organic compound having two or more reactive hydrogen functional groups;
    (b) a polyisocyanate; and
    (c) a polyester prepolymer which is the reaction product of
        (i) an organic compound having at least three reactive carboxyl acid groups; and
        (ii) a polyether alcohol.

2. A water-dispersible, laterally stabilized polyester polyurethane resin as defined by claim 1 comprising between about 50% by weight to about 85% by weight polyester segments, said polyester segments having randomly distributed pendant polyether side chain groups.

3. A water-dispersible, laterally stabilized polyester polyurethane resin as defined by claim 2 wherein said randomly distributed pendant polyether side chain groups comprise 10% by weight to about 30% by weight of said polyester segments.

4. A water-dispersible, laterally stabilized polyester polyurethane resin as defined by claim 1 wherein said polyether alcohol compound has the general formula

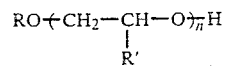

where R is alkyl of from one to four carbon atoms and R' is hydrogen or alkyl of from one to four carbon atoms, and the nominal value of n ranges between 20 and 75.

5. A water-dispersible, laterally stabilized polyester polyurethane resin as defined by claim 1 wherein said organic compound having two or more reactive hydrogen functional groups is selected from the group consisting of diols, triols, dicarboxylic acids, and tricarboxylic acids.

6. A water-dispersible, laterally stabilized polyester polyurethane resin as defined by claim 1 wherein said organic compound having two or more reactive hydrogen functional groups is selected from the group consisting of
    ethylene glycol;
    propylene glycol;
    butylene glycol;
    1,6-hexanediol;
    trimethylolethane;
    trimethylolpropane;
    esters of ethylene glycol, propylene glycol, butylene glycol, 1,6-hexanediol, trimethylolethane, trimethylolpropane, and the like with hydroxy acids or alkyl-substituted hydroxy acids, including the 3-hydroxy-2,2-dimethylpropyl ester of 3-hydroxy-2,2-dimethylpropanoic acid;
    iso-phthalic acid;
    adipic acid; and
    $C_{36}$ dimer fatty acid.

7. A water-dispersible, laterally stabilized polyester polyurethane resin as defined by claim 1 wherein said poliisocyanate is selected from the group consisting of aliphatic and cycloaliphatic diisocyanates.

8. A water-dispersible, laterally stabilized polyester polyurethane resin as defined by claim 1 wherein said poliisocyanate is isophorone diisocyanate.

9. A water-dispersible, laterally stabilized polyester polyurethane resin as defined by claim 1 further reacted with a capping agent.

10. A water-dispersible, laterally stabilized polyester polyurethane resin as defined by claim 9 wherein said capping agent is selected from the group consisting of diols, triols, and amino polyols.

11. A process for preparing a laterally stabilized, water-miscible polyester polyurethane resin comprising the steps of:
    A. preparing an adduct by reacting a mixture of 3.0 to 3.5 equivalents of a polyether alcohol with 1 equivalent of a trifunctional carboxylic acid;
    B. reacting said adduct with a mixture comprising diols, triols, and diacids, said mixture having from about 1.15 to about 1.5 equivalents of hydroxyl functionality per equivalent of carboxylic acid functionality, to form a polyester prepolymer;
    C. reacting said polyester prepolymer with a mixture comprising one or more polyisocyanates and one or more polyols, said mixture comprising between about 1.1 equivalents and about 1.5 equivalents of isocyanate functionality per equivalent of hydroxyl functionality, to form a polyester polyurethane polymer having free isocyanate functionality; and D. reacting said polymer having free isocyanate functionality with a capping reagent selected from diols, triols, and aminopolyols to produce a polyester polyurethane polymer having no free isocyanate functionality.

12. A process as defined by claim 11 wherein the polyester prepolymer product of step B has an acid number of less than about 10.

13. A process as defined by claim 11 wherein the polyester prepolymer product of step B has a weight per hydroxyl of between about 600 and about 1200.

14. A process as defined by claim 11 wherein said capping reagent employed in step D is a diol, present in an amount of between about 1.5 equivalents to about 2.0 equivalents of hydroxyl functionality per equivalent of isocyanate functionality of said polyurethane polymer having free isocyanate functionality.

15. A process as defined by claim 11 wherein said capping reagent employed in step D is a triol, present in an amount of between about 2.5 equivalents to about 3.0 equivalents of hydroxyl functionality per equivalent of isocyanate functionality of said polyurethane polymer having free isocyanate functionality.

16. A process as defined by claim 15 wherein said capping reagent employed in step D is a mixture of a diol and a triol, present in an amount of between about 2.0 equivalents to about 2.5 equivalents of hydroxyl functionality per equivalent of isocyanate functionality of said polyurethane polymer having free isocyanate functionality.

17. A water-borne coating composition comprising a laterally stabilized polyester polyurethane resin as defined by claim 1.

18. A substrate body coated with one or more layers deposited from a coating composition as defined by claim 17.

* * * * *